United States Patent [19]
Metz

[11] Patent Number: 5,196,113
[45] Date of Patent: Mar. 23, 1993

[54] PROCESSING MIXED WASTE

[75] Inventor: Brian D. Metz, Oceanside, Calif.

[73] Assignee: Southern California Edison Co., Rosemead, Calif.

[21] Appl. No.: 734,339

[22] Filed: Jul. 22, 1991

Related U.S. Application Data

[62] Division of Ser. No. 482,883, Feb. 21, 1990, Pat. No. 5,076,936.

[51] Int. Cl.$^5$ .............................. C02F 1/28; C02F 1/42
[52] U.S. Cl. ................................. 210/181; 210/182; 210/195.1; 210/196; 210/199; 210/202; 210/203; 210/205; 210/206; 210/259; 210/284; 210/314
[58] Field of Search ............... 210/774, 175, 181, 182, 210/184, 263, 265, 198.1, 200–203, 205, 194, 195.1, 513, 196, 206, 284, 259, 314

[56] References Cited

U.S. PATENT DOCUMENTS 4,681,705  7/1987  Robertson .
4,800,024  1/1989  Elfline .
4,853,130  8/1989  D'Angelo et al. .
4,855,080  8/1989  McConaghy et al. .
4,863,637  9/1989  Matsumoto et al. .
4,925,597  5/1990  Ganter .

OTHER PUBLICATIONS

"Radioactive Decontamination of Waste Oil by Filtration, Centrifugation, and Chelation", Robertson et al., *Nuclear and Chemical Waste Management*, vol. 7, pp. 257–263 (1987).

*Primary Examiner*—Stanley S. Silverman
*Assistant Examiner*—Neil McCarthy
*Attorney, Agent, or Firm*—Charles Berman

[57] ABSTRACT

Removing radioactive contaminants from liquid hazardous material such as oil, includes recirculating the material between a processing tank and a filter medium. The material is heated to increase viscosity during the circulation through the tank and filters. Chemicals including chelating agents are added to enhance the removal of the radioactive elements. Water is added to the processing tank or upstream, in a settling tank, to effect a water wash of the liquid hazardous material. A pre-filter stage upstream of the settling tank is followed by a mid-range filter stage in the recirculation loop with the main processing tank. A finishing filter stage is in the outlet from the main processing tank.

12 Claims, 1 Drawing Sheet

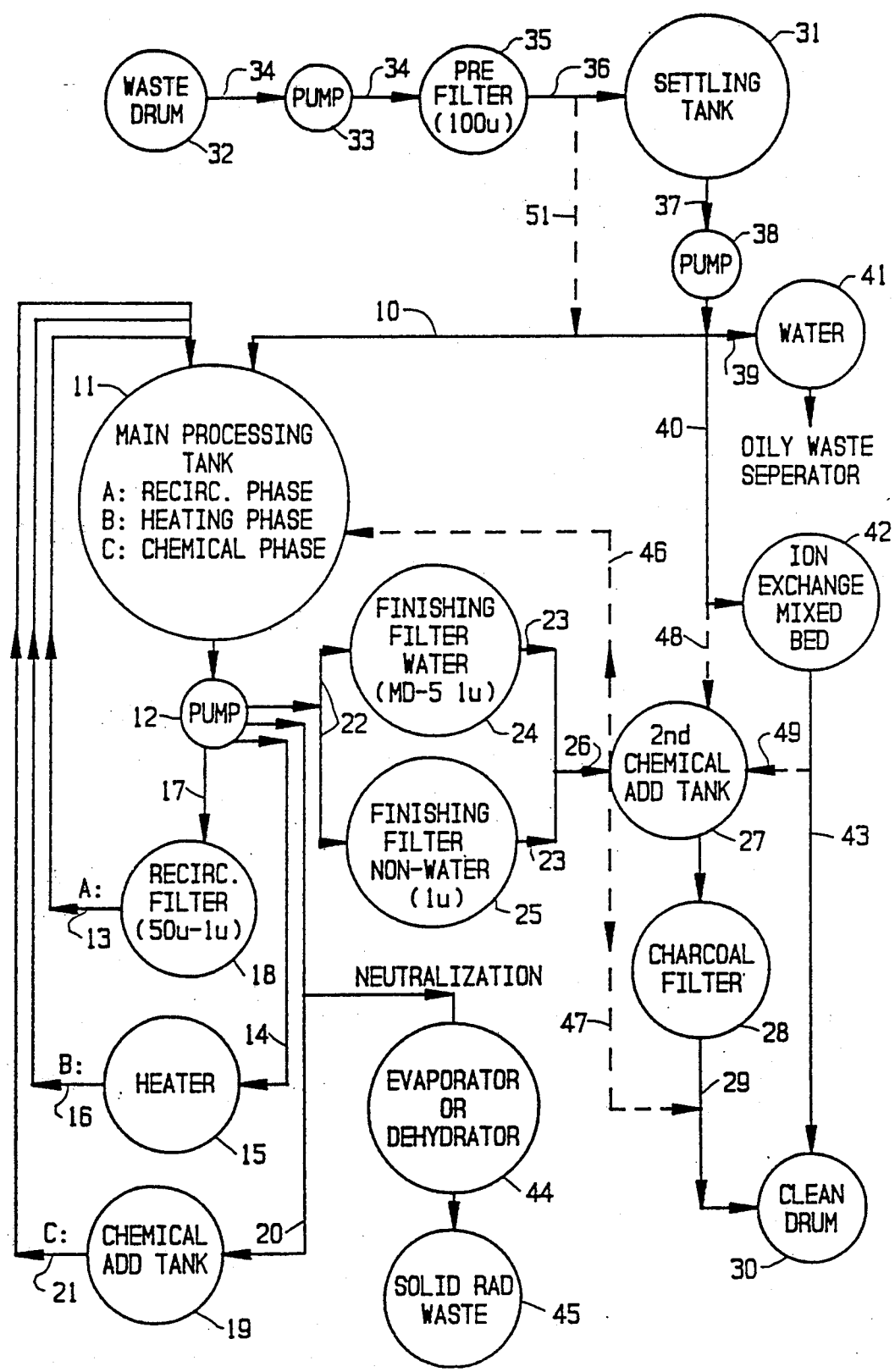

PROCESSING MIXED WASTE

This is a division of the application Ser. No. 07/482,883, filed Feb. 21, 1990, now U.S. Pat. No. 5,076,936.

BACKGROUND

The disposal of hazardous waste containing radioactive elements is expensive and difficult. At the same time it is important to safeguard the environment.

This invention relates to the processing of mixed waste. In particular, the invention relates to the removal of radioactivity from liquid hazardous waste which also includes material known as mixed waste. Moreover, the treatment should be considered to effect treatment of solid hazardous waste. Such treatment would include a step to liquify the waste so that the treatment is then effected on a liquid hazardous waste. As such, the term "liquid hazardous waste" is to be considered to include liquid hazardous waste and materials which are no longer useable and also other waste such as solid waste which is liquified. Liquid hazardous waste also refers to waste oils. The terms "liquid hazardous material" and "liquid hazardous waste" are used interchangeably.

Nuclear electric generating facilities accumulate large volumes of liquid hazardous wastes during normal operation and during maintenance activities. Some of these liquid hazardous wastes are found to be contaminated with radioactive material. Much of the radioactive material is at a low concentration.

Materials such as waste oils and other hazardous or toxic wastes are otherwise known as liquid hazardous waste and it is important to be able to dispose of this material safely and economically. In the United States, this type of waste is governed by the Nuclear Regulatory Commission (NRC) and also the Environmental Protection Agency (EPA).

Mixed waste may be generated in several other ways. For example, a solvent used by a power plant worker to clean a radioactively contaminated reactor coolant pump. If the solvent is listed by the EPA as hazardous and the pump is slightly radioactive, the solvent would be a mixed waste. The solvent generally poses a greater chemical hazard than radioactive hazard. Three to 10 percent of Low Level Radioactive Waste (LLW) is also considered mixed LLW or mixed waste since it contains both radioactive and hazardous contaminants.

Treatment is a critical step in managing mixed waste. Since no off-site treatment or storage facilities are available for mixed waste, generators try to the extent practicable, to alter their waste to exclusively hazardous waste, for which management options are available. Despite efforts, mixed waste is still generated, containing hazardous constituents that the EPA bans from disposal until a particular treatment standard is met.

It is an object of the present invention to provide a method of treatment for liquid hazardous material and waste within which is included mixed waste. The applicant believes the treatment will minimize difficulties which currently exist.

SUMMARY

According to the invention decontaminating or removing radioactive elements or contaminants from a hazardous material being in a liquid phase includes a procedure of recirculating material and filtering the material so circulated.

During circulation, heating is effected to increase the viscosity of the material being recirculated. Additionally, chemicals, such as a chelating agent, are added to the recirculating liquid hazardous material to enhance the removal of radioactive elements from the liquid hazardous material.

According to a preferred form of the invention, prior to entry into a processing tank where recirculation, heating, and chemical addition is effected, the liquid hazardous material is subject to a settling step where water is removed from the liquid hazardous material.

Also, in the settling tank step or in the recirculation step through the processing tank, a volume of water is added to the liquid hazardous material to effect a water wash of the liquid hazardous material.

Further the hazardous material is treated progressively by three different grades of filter, each being progressively finer.

The invention is directed to the method for removal of the radioactive elements, the apparatus for performing such method, and the product cleansed of the radioactive elements.

The invention is now further described with reference to the accompanying drawing.

DRAWINGS

The FIGURE is a flow diagram illustrating the method and apparatus for performing the invention.

DESCRIPTION

The flow diagram illustrates the mixed waste processing unit for removing radioactive contaminants from liquid hazardous material. The liquid is directed along line 10 to a main processing tank 11. A pump 12 recirculates liquid through the main processing tank as indicated along line 13. Additionally, the pump 12 directs the liquid along line 14 to a heater 15 which returns liquid along line 16 to the main processing tank 11. Pump 12 also directs liquid along line 17 to a recirculating filter 18 which is contained in the line between line 17 and line 13. This filter 18 removes radioactive particulates in the filter medium. Chemicals are added to liquid in the main processing tank 11 through chemical add tank 19 which receives liquid from the pump 12 from line 20. The chemical addition is directed along line 21 back to the main processing tank 11.

An outlet line 22 from pump 12 directs liquid from the main processing tank to a filter bank system 23. Such system 23 includes the finishing filters, or fine filters, for the remaining liquid hazardous material. Filter elements 24 and 25 in a bank constitute the finishing filter 23.

Downstream from the filter bank system 23, the remaining liquid is directed along line 26 to a second chemical addition tank 27 and in turn a charcoal filter 28. The output from the filter 28 is directed along line 29 to a reservoir or drum 30 for collecting cleaned liquid hazardous material. The liquid can be directed along line 26 and can bypass the chemical addition tank 27 and the charcoal filter 28 can be routed to the main processing in tank 11 or to the clean drum 30. This is illustrated by phantom lines 46 and 47 respectively.

Upstream of the main processing tank 11, there is a settling tank 31. The settling tank 31 receives liquid hazardous material from a waste drum 32 which pumps the waste material along line 34 to a pre-filter 35. In turn, the liquid is directed to an outlet line 36 which feeds the settling tank 31. The outlet from the settling tank 31 is directed along line 37 through pump 38. The liquid hazardous material is directed along line 10 while separated water is directed along line 39 or line 40. Water along line 39 is directed to the water separator 41 which acts as an oily waste separator. Oil is returned back for radioactive treatment in the settling tank 31. Along line 40 an ion exchange mixed bed 42 separates the ionic phase of radioactive element and clean liquid is directed along line 43 to the clean drum 30.

In some cases discharge from the pump 38 can be directed to the second chemical addition tank 27, thereby bypassing the mixed bed 42. This is indicated by phantom line 48. This is for removing radioactive elements in the ionic phase and organics. Alternatively the mixed bed 42 outlet can be directed to the chemical addition tank 27, as indicated by phantom line 49. This is for removing organics and radioactive elements. Also in other cases the settling tank 31 is bypassed and the pre-filter 35 discharges directly with line 10.

The method and apparatus for decontaminating and removing radioactive contaminants from liquid hazardous materials includes the main processing tank 11. The primary hazardous materials treated in the tank are oil (synthetic and otherwise), ethylene glycol, solvents and paints. The radioactive elements or isotopes which are eliminated are Cesium 134, 137, Cobalt 57, 58 and 60, Iodine 131, Chromium 51, Magnesium 54, Niobium 95, Zirconium 95 and Cerium 141, at levels of approximately $1.0 \times 10^{-5}$ to $1.0 \times 10^{-9}$ micro-curies per cc. The amount of radioactivity was reduced to below detectable levels, and the radioactive isotopes were separated from the hazardous or toxic material.

The method and apparatus were geared around the three types of radioactive contaminants: ionic, colloidal, and particulate forms. Different phases of the process removed specific phases, or forms, of the radioactivity to below detectability.

An example of using the apparatus and method of the invention is described.

The diagram shows the main processing tank 11 and settling tank 31. Flow starts out with liquid hazardous material in the waste drum 32.

The waste drum 32 was initially sampled and categorized. The initial sampling was for types of hazardous material or waste, the types of isotopes and the activity levels of those isotopes.

At this point, each hazardous material was broken down and put into the category for that specific hazardous material. The hazardous class was then broken into further categories based on the activity level and the types of isotopes found in that hazardous material. This mixed waste processing unit is generally a batch processing.

Once the categorization and initial sampling had taken place, an amount of about 500 to 800 gallons of hazardous liquid such as oil, solvent, and ethylene glycol, are grouped together so that they could be run through this processing unit. For each respective processing, the respective waste drums 32 are pumped into a settling tank 31.

Before the liquid hazardous material was pumped into a settling tank 31, the material was pumped through the pre-filter 35 of 100 microns. The pre-filter 35 is a bag filter. Should the material or waste be relatively clean, and there does not appear to be much sediment in the waste, the pre-filter 35 can probably be 50 microns. This eliminates needless radioactive waste, as the filters 35, once filled with crud, are disposed of as radioactive in a normal radioactive landfill.

The hazardous material sits in the settling tank, for approximately a day to a week, depending on the separation of the material. At this point, the material could be identified in several layers. If there were different toxic wastes associated with the initial categorization of the material, these were separated by phases, and put back into their correct category or block of wastes. Each specific waste was treated separately at a specific time.

If there is water from the waste, this was run through an ion-exchange resin mixed bed 42. The mixed bed can relate to cation only, anion only or a combination of both. This eliminates the ionic phase of the radioactive elements. If this waste were an oil-based waste, with no organic contaminants or solvents in the waste, the water can also be run through the oily waste separator 41. The oil can then be run back through the processing stage.

Once the primary type of material was separated and was in the settling tank 31, it was then pumped into the main processing tank 11. In this main processing tank 11, the circulation or recirculation, the heating, and the chemical phases all take place.

Initially, the recirculation and heating were the primary steps of the main processing tank. Recirculation is important in relation to the speed of pump 12. A pump 12 at a speed less than 50 gallons per minute occasionally took several days to weeks longer to process the hazardous material. This was due to the fact that the material was not recirculated as fast or as efficiently as a 100-125 gallon per minute pump 12. When treating 500 to 800 gallons of liquid hazardous material, the rate of pump 12 should be greater than 50 gpm. The rate of 125 gpm is effective to obtain the full recirculation of the tank 11.

Heating is important when dealing with a hazardous material being oil for the following reasons. Heating changes the viscosity of the oil to allow faster flow rates through filters 18 more efficiently. This permits continuation with the recirculation phase at a higher speed, and permits a more thorough mixing.

The recirculation phase is sped up to enhance the separation of the entrained water, which is usually within toxic material. Specifically with oil, there is usually some percentage of water that cannot be removed by normal separation. This is due to the fact that the oil may be emulsified or the water entrained in the oil and thus cannot be removed. At this point, the heating and the recirculation phase help or enhance removal.

During the recirculation phase, the mixed waste was run through a medium degree of filtration being filter 18. This filter 18 was composed of 50 micron, 10 micron or 1 micron bag filters. The waste was gradually run through all sets of these filters to establish the fact that most of the particulates through a 1 micron size filter have been removed. The heater 15 enhanced the ability for the recirculation phase to proceed.

A chemical phase, at this point, was an effective step in the processing of hazardous material, namely, mixed waste. The chemical phase was composed of several chemicals which enhanced or helped remove the radioactive elements.

The first chemical used was a chelating agent, namely, ethylenediaminetetraacetic acid [EDTA] in sodium form. With this, a pH adjuster chemical was added to increase the pH to between 9 and 12, and preferably about 10 or 11. This helps the chelating agent to work more efficiently.

The temperature or heating phase continued to greater than 50° F. and preferably until about 175° F. to about 190° F. was established. Although the higher temperature works more efficiently, the working parts, such as a pump 12, do not usually handle temperatures over 200° Fahrenheit to 220° Fahrenheit.

Several chemicals were selectively added. There were several purposes for the chemicals applied to the process which work and help with the decontamination process. The first was sodium EDTA. The second was sodium hydroxide. The group of chemicals that were carrier chemicals, were selectively cesium chloride and cobalt chloride, ferric chloride. Fourthly, hydrochloric acid, hydrogen peroxide and sodium citrate were added.

The acid used to neutralize the caustic byproduct was phosphoric or sulfuric. The chloride (cesium chloride, cobalt chloride and ferric chloride) and hydrochloric acid were added to the mixed waste to (1) acid wash, and (2) have the substitution for a non-radioactive cesium or cobalt change places. If, during the acid or water wash, the radioactive cesium falls off the oil (acidify to put into same oxidation state), then non-radioactive cesium ion takes its place. All or some of these chemicals in the process can be used in the decontamination process.

The amounts of the chemicals used were less than one liter each, due to the fact there were low levels of cesium, cobalt chloride or other carrier ion contamination. The hydrochloric acid added was approximately 250 milliliters per 800 gallons. The ferric chloride was approximately 500 milliliters. The cesium and cobalt chloride were approximately 125 milliliters or less per batch. These helped reduce the amount of radioactivity due to the ultimate switch at radioactive element bonding sites in the hazardous material.

The ferric chloride was used as a final flocculent/cleaner of the radioactive isotopes. A 1 micron or less finishing filter 23 was used to remove essentially all of the remaining activity and the flocculent from the hazardous material.

The amounts of sodium EDTA and sodium hydroxide would vary depending on the amount of water which was found in the hazardous material being processed. Sodium EDTA and sodium hydroxide were also used. The amount of sodium EDTA was approximately 9 to 10 kilograms per 800 gallons and sodium hydroxide was roughly half of that for the optimum pH to be around 11. Sodium citrate was used in the charcoal filter 28 phase for processing of water to eliminate organic products, if needed.

The main processing tank 11 was lined or surrounded with insulation to help with the prevention of heat loss.

Another step to the process was the addition of 10 to 20 gallons of water (the maximum should be 45 gallons) to the liquid hazardous material, namely, mixed waste, prior to or during the addition of the solid sodium EDTA and sodium hydroxide. Water added to a mixed waste without water, enhances the process. This was an unusual step in the process, since one would not normally add clean items to radioactive items, thus creating more radioactive, low level radioactive material, hazardous material or mixed waste.

The addition of the water can be to the main processing tank 11 or at the settling tank 31 phase earlier in the processing. This created a water washing instead of a normal acid washing due to the fact that acid is more difficult to dispose of in a radioactive mixed waste arena. The water allowed the radioactive isotopes to cling to that phase. It also allowed the entrained water to possibly cling to water molecules, and thus eliminated entrained water. It was also used in the chemical phase in the main processing tank 11 to enhance the circulation of the chemicals, allowing the chemicals to travel more freely through the liquid hazardous material or mixed waste. This stage was primarily used in the hazardous material or mixed wastes that were water immiscible. When added to the main processing tank 11, water is added through the chemical add tank 19. When added to the settling tank 31 an additional supply is provided to the inlet line 36.

Once the chemicals have been added, the radioactivity tends to cling, or jump into the water phase, or the water with the chemical phase, and can be removed via separation. At this point, once separated, the water phase was then neutralized with an acid and run through an evaporator or dehydrator 44 and sent out as a solid radioactive waste 45 as it contained no more hazardous waste properties and was a salt. Should this not be allowed, it could also be run through ion-exchange and finer filtration, to eliminate the salt prior to being run through the ion-exchange.

The mixed waste through which the chemicals have been recirculating, chelating and rebonding the non-radioactive isotopes, was then run through the last stage or step of the process, which is the finishing filters 23.

The finishing filters 23 can either be a water based or a non-water based filter. The filter 23, which is 1 micron absolute and sub-micronic removed any additional water that was composed in the toxic mixed waste. At this point, the activity was also left inside the filter 23 as any of the finer particulate activity should have been removed via the separation and chemical addition.

Essentially, anything that remained was entrapped on the finishing or polishing filter 25. If the mixed waste was water based, the water based product can be run through a second chemical add tank 27 which would be the adding of sodium citrate. Sodium citrate helped remove the radioactivity by enhancing the ability for the radioactivity in the water to adhere to a filtering media 28. Sodium citrate works well with charcoal and would thus be run through charcoal to remove any organic based contaminants in the water phase.

At this point, the activity was removed, the water based product was essentially just water. It was clean and could be run through any numerous amount of systems. It could run through ion-exchange if there were any ionic elements that were still thought to be in it. If they were still radioactive, it could be run through radioactive/mixed waste processing systems.

An important, independent, phase for oil based liquid hazardous materials was heating to over 175° Fahrenheit. About 185° to 190° Fahrenheit appeared to work the best. A recirculation and chemical addition phase of the processing was also independently important. This allowed the chemicals, including carrier chemicals, and chelating agents to be more active with the radioactive bonding sites.

Independently, the water addition was important. Water addition was included in the chemical phase. To the mixed waste, which is water immiscible, the adding of the water enhances the chemicals and chelating agents to bond more readily. It provided a good water washing. This allowed a lot of the activity to run through the water. This water was easily run through ion-exchange (mixed beds) and the activity was then removed.

Also, independently, the adding of cobalt, cesium and ferric chloride, or other carrier chemicals after water washing or slight acid washing often helped put a cesium, cobalt or iron element which is non-radioactive in the place of the radioactive element.

Final filtration or polishing filters 23 removed any of the last remaining particulate or colloidal phases of the radioactive isotopes within the mixed waste. This included the flocculents created by the chemical phase.

The charcoal filter 28 and the mixed bed resin filters 35 and 18 which were used on separate stages or phases of this separation process, can be interchangeable through a filter housing. Prior to running through the charcoal filter 28, the fluid is usually run through a sub-micron filter to eliminate any of the heavy particulates to allow for the liquid to be free of any contaminants which might affect the filter media, such as the charcoal or the resin.

The final process stage is the final sampling. The product is run through a gammaspectrophotometer at a thousand seconds. If activity was picked up, the decontamination process can be run again through the same steps as mentioned before. If activity was not detected, the product can either be resampled and checked again, or it can be classified as "clean" free of radioactivity. End clean product, such as oil, can be reused or recycled for different purposes.

The above description is related, essentially, to oil-based liquid hazardous material. Not all the steps may be necessary for other liquid hazardous material which are not oil-based, such as, certain solvents, or ethylene glycol. Thus, the filtration steps should be considered independently. Also, the water addition step should be considered independent. Likewise, the re-circulation step is an independent step, as are the chelating step, the heating step, and the addition of chemicals independent steps. When these steps are considered selectively together with different materials being treated, different degrees of effective treatment of the material is achieved. With oil-based material the filtration, recirculating, heating, chelating, and chemical addition steps were most effective.

Many other forms of the invention exist, each differing from the other in matters of detail only. For instance, although the invention is described with reference to batch processing between about 500 to 800 gallons of liquid hazardous material, the invention can operate with higher volumes of such material. As such, amounts between about 1000 gallons and about 2000 gallons can be handled by this procedure.

The scope of the present invention is to be determined solely by the appended claims.

I claim:

1. Apparatus for removing radioactive chemicals including cobalt 60 from liquid hazardous waste containing at least one organic phase and an aqueous phase, said apparatus comprising:
   means for separating any organic phases from the aqueous phase;
   means comprising an ion exchange mixed bed for treating the aqueous phase for removing therefrom ionic radioactive contaminants;
   means comprising a charcoal filter for removing organic contaminants from the aqueous phase;
   means associated with said charcoal filter for adding a chemical to the aqueous phase, said chemical facilitating removal of organic contaminants from the aqueous phase in the charcoal filter;
   a main processing tank for processing said at least one organic phase having said radioactive contaminants;
   means for directing said organic phase into the processing tank;
   means for adding a non-radioactive chemical containing cobalt 60 to the organic phase in the processing tank for exchanging radioactive cobalt contaminants in the organic phase with the non-radioactive cobalt added thereto;
   means for circulating said organic phase through the processing tank;
   a filter associated with said processing tank for removing radioactive particulates from said organic phase circulating through said processing tank;
   wherein said apparatus is effective to remove cobalt 60 from each of said organic phase and said aqueous phase in such an amount that the level of cobalt 60 remaining in any of said phases is essentially undetectable as measured by non-detection of radioactivity for at least about 1,000 seconds by a gamma spectrophotometer.

2. Apparatus as claimed in claim 1 including heating means for heating the liquid hazardous material in the main processing tank.

3. Apparatus as claimed in claim 2 including a heater located downstream of the processing tank in a liquid path recirculating liquid to the main processing tank.

4. Apparatus as claimed in claim 1 including a chemical addition tank for adding a chemical to the organic phase in the main processing tank.

5. Apparatus as claimed in claim 1 including pump means for selectively recirculating liquid through the main processing tank, directing liquid through a heater to the main processing tank, and directing liquid through a chemical addition tank to the main processing tank.

6. Apparatus as claimed in claim 5 including a finishing filter downstream of the main processing tank, and wherein the pump includes means for selectively directing liquid to the finishing filters.

7. Apparatus as claimed in claim 1 including at least one of an evaporator or dehydrator located downstream of the main processing tank, such evaporator or dehydrator acting to solidify radioactive material in an aqueous phase directed from the main processing tank.

8. Apparatus as claimed claim 1 including a settling tank upstream of the processing tank.

9. Apparatus as claimed in claim 8 including a pre-filter located upstream of the settling tank, such pre-filter being for removal of coarser radioactive elements upstream of the settling tank.

10. Apparatus as claimed in claim 9 including pump means for directing liquid from the settling tank to the main processing tank and liquid separated in the settling tank to said ion-exchange mixed bed for removal of ionic phase radioactive elements.

11. Apparatus as claimed in claim 9, including separator means for removing oil from the settling tank and returning said oil to the settling tank.

12. Apparatus as claimed in claim 1, including means for adding water to the liquid hazardous material at or upstream of the processing tank.

* * * * *